(12) United States Patent
Tonnelier

(10) Patent No.: US 10,878,210 B2
(45) Date of Patent: Dec. 29, 2020

(54) METHOD AND APPARATUS FOR SECURE IDENTIFIER MANAGEMENT

(71) Applicant: MOBILEAD, Paris (FR)

(72) Inventor: Laurent Tonnelier, Paris (FR)

(73) Assignee: MOBILEAD, Paris (FR)

( * ) Notice: Subject to any disclaimer, the term of this patent is extended or adjusted under 35 U.S.C. 154(b) by 0 days.

(21) Appl. No.: 15/871,287

(22) Filed: Jan. 15, 2018

(65) Prior Publication Data

US 2018/0204034 A1 Jul. 19, 2018

(30) Foreign Application Priority Data

Jan. 17, 2017 (EP) .................................... 17305049

(51) Int. Cl.
| | |
|---|---|
| *G06K 7/10* | (2006.01) |
| *G06K 19/06* | (2006.01) |
| *H04L 9/06* | (2006.01) |
| *G06F 16/2457* | (2019.01) |
| *G06Q 30/00* | (2012.01) |

(52) U.S. Cl.
CPC ... *G06K 7/10762* (2013.01); *G06F 16/24575* (2019.01); *G06K 19/06028* (2013.01); *G06Q 30/0185* (2013.01); *H04L 9/0643* (2013.01)

(58) Field of Classification Search
CPC ......... G06K 7/10762; G06K 19/06028; G06K 17/00; H04L 9/0643; G06F 17/30528; G06F 16/24575; G06Q 30/0185; G06Q 20/3821
See application file for complete search history.

(56) References Cited

U.S. PATENT DOCUMENTS

| | | | |
|---|---|---|---|
| 5,726,435 A | 3/1998 | Hara et al. | |
| 10,002,362 B1* | 6/2018 | Endress | .................... G09C 1/00 |
| 2013/0185322 A1* | 7/2013 | Vegh | .................... G06Q 10/103 |
| | | | 707/769 |
| 2016/0321677 A1* | 11/2016 | Dobaj | ................ G06Q 30/0185 |

FOREIGN PATENT DOCUMENTS

EP 2428925 A1 3/2012

OTHER PUBLICATIONS

European Search Report for 17305049.3 dated Jul. 6, 2017.

* cited by examiner

*Primary Examiner* — Sonji N Johnson
(74) *Attorney, Agent, or Firm* — Meagher Emanuel Laks Goldberg & Liao, LLP

(57) ABSTRACT

Secure identifiers for a series of articles are generated by encoding a characterising value such as a time stamp or serial number of each article with a pointer to a database entry such as a blockchain entry storing a range of valid characterising values, or other rule permitting the validation of each characterising value. When an identifier is challenged, the pointer is extracted and used to retrieve the rule, against which the characterising value extracted from the same identifier is tested.

15 Claims, 6 Drawing Sheets

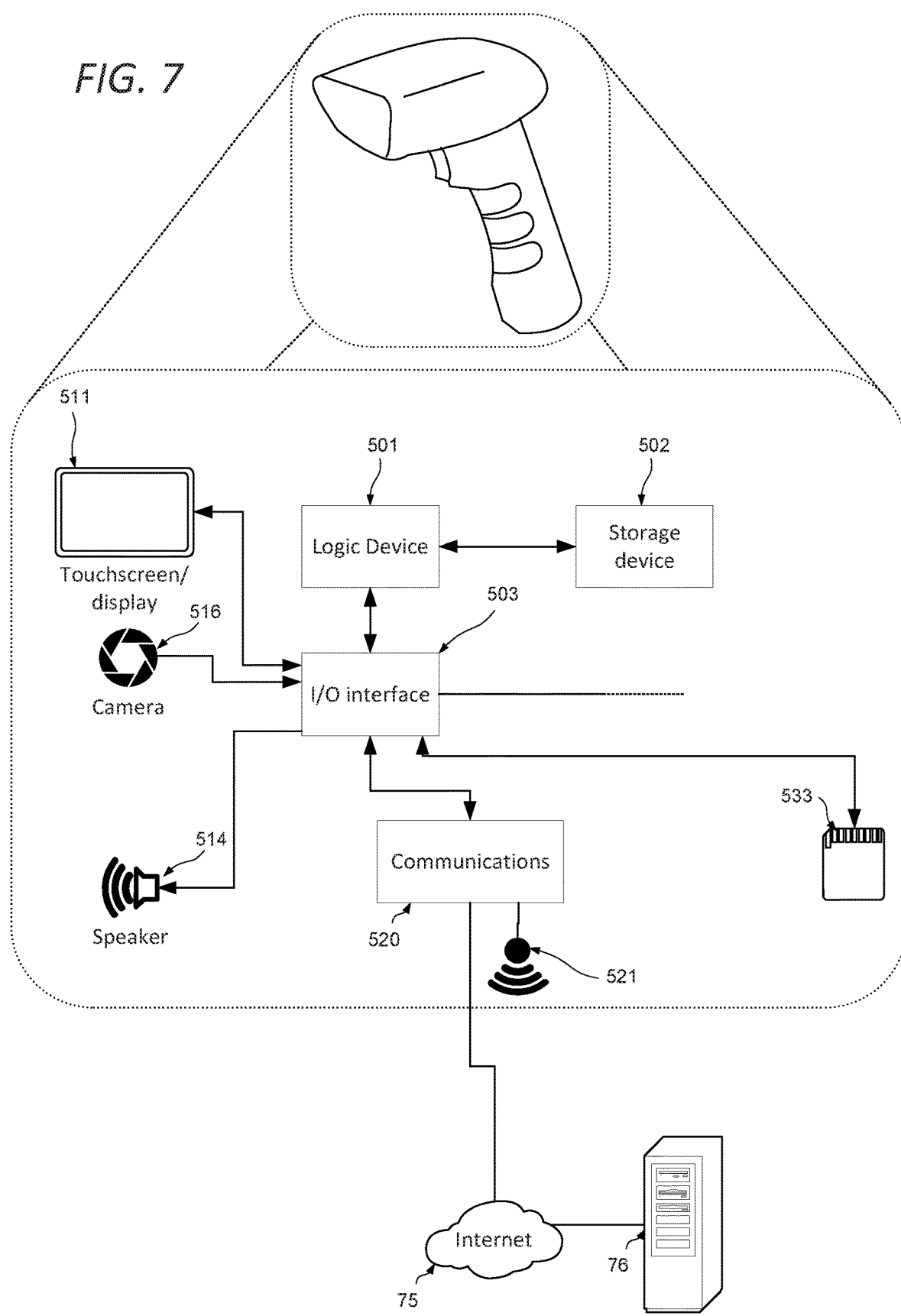

METHOD AND APPARATUS FOR SECURE IDENTIFIER MANAGEMENT

FIELD OF THE INVENTION

The present invention relates to the generation and validation of secure unique identifiers.

BACKGROUND OF THE INVENTION

Logistics as a field inherently attracts information technology solutions, and as internet technology has developed through the twentieth century a number of different mechanisms for making a connection between an object and an electronic information handling system have been developed. Punched cards were developed as the original input means for computing devices, and the possibility of using similar cards was quickly identified as a rapid means of registering the sale of an object. A major development in this field came with the development of the Universal Product Code system, based on the reading of a one dimensional barcode with a laser scanner. On the basis of this and related technologies, virtually all packaged consumer goods today are provided with such a code. More recently, matrix, or two dimensional bar codes, such as "QR Codes" (registered trademark in some jurisdictions) described for instance in U.S. Pat. No. 5,726,435 have become common. Such codes are able to encode more information in a small area than conventional 1 dimensional bar codes, and as such are frequently used to encode a Uniform Resource Indicator. Meanwhile, in addition to these optical solutions, radio based tagging solutions such as those based on RFID tags are increasingly widespread.

A particular application of these technologies is in support of the determination of the authenticity and provenance of individual items. Typically, a unique identifier stored in a representation as described above is affixed to each article, and the identifier stored in a remote database together with whatever additional information may be appropriate to the particular application. When the unique identifier is read, it is translated into a call to the database, and the corresponding information is retrieved. Unique identifiers that are not authentic may have no corresponding information, thereby exposing the lack of authenticity of the corresponding article. Simple implementations of such mechanisms may be defeated simply by duplicating an identifier known to be valid.

An inherent characteristic of this approach is that it will tend to produce a large number of entries in the remote database (one for each article). This quickly becomes an issue as layers of security are imposed on the identifiers and the database, as decryption and other processing are increasingly called for, the size of the database and the level of processing power for handling queries to it rapidly increases. This is particularly the case with Blockchain based approaches. Indeed, certain Blockchain technologies such as the Bitcoin system explicitly pass this burden on to system users by imposing a charge on users for example as explained at "https://en.bitcoin.it/wiki/Transaction_fees". Each entry in the blockchain incurs a predetermined charge, so that attempting to record every unique identifier in the blockchain for articles that are sold in large numbers at a low unit cost rapidly becomes prohibitively expensive.

Two general prior art solutions to this problem are described below:
1. A hash is obtained (e.g. using the Merkle algorithm) for the Unique Identifiers of a set of articles, and this hash is stored in the database instead of the Unique Identifiers themselves. This can drastically reduce the number of entries in the primary database, but means that an individual Unique Identifier can only be checked if all of the other UIDs are also known. An example of this approach may be found in the solution provided by pufin.org.
2. A list is compiled of the Unique Identifiers of a set of articles, and this list is associated with its own identifier, which is stored in the authenticating database, and the list deposited with a trusted third party. An individual UID can then be checked by verifying that the UID appears in the list, and that the List ID is Authentic. This can drastically reduce the number of database entries, but means that a new trusted third party entity must be introduced, with associated processing overhead and security concerns.

It is thus desirable to provide a mechanism for secure identifier management which alleviates or suppresses these limitations to some degree.

SUMMARY OF THE INVENTION

In accordance with the present invention in a first aspect there is provided an apparatus for creating an identifier for a selected entity belonging to a defined set of entities, where each entity has a characterizing value and where each characterizing value complies with a recorded rule, the apparatus being adapted to receive a locator for the recorded rule, and to encode the characterizing value of the selected entity together with the locator.

Since only characterising values complying with the recorded rule are used in creating identifiers, any purported identifier including a purported characterising value not complying with the rule can be readily identified as a counterfeit. By encoding the characterising value together with the location of the rule, it is ensured that the identifier contains the necessary information for assessing the validity of the identifier by indicating where the relevant rule may be obtained, whilst at the same time allowing for the storing of the rule in a secure manner.

In a development of the first aspect, the apparatus may further be adapted to associate a characterizing value with each entity, to determining the rule such that the rule defines each characterizing value, and to record the rule such that it may be retrieved with the locator.

In accordance with the present invention in a second aspect there is provided an apparatus for identifying a selected entity belonging to a defined set of entities, the selected entity having an identifier, the apparatus being adapted to:
 read the identifier,
 extract a locator from the identifier,
 retrieve a recorded rule corresponding to the locator,
 extract a characterising value from the identifier, and
 determine whether the characterising value complies with the rule.

In accordance with the present invention in a third aspect there is provided an identifier for a selected entity belonging to a defined set of entities, where each entity has a characterizing value and where each characterizing value complies with a recorded rule, the identifier comprising the respective characterizing value of the selected entity encoded together with a locator for the recorded rule.

In accordance with the present invention in a fourth aspect there is provided a machine readable label encoded with the identifier of the third aspect.

In accordance with the present invention in a fifth aspect there is provided a method of creating an identifier for a selected entity belonging to a defined set of entities, where each entity has a characterizing value and where each characterizing value complies with a recorded rule, the method comprising the steps of:
receiving a locator for the recorded rule, and
encoding the characterising value of the selected entity together with the locator.

In a development of the fifth aspect the method may comprise the further steps of:
associating a respective characterising value with each entity,
determining the rule such that the rule defines each characterizing value,
recording the rule such that it may be retrieved with a locator.

In accordance with the present invention in a sixth aspect there may be provided a method of identifying a selected entity belonging to a defined set of entities, the selected entity having an identifier, the method comprising the steps of extracting a locator from the identifier,
retrieving a recorded rule corresponding to the locator,
extracting a characterising value from the identifier, and
determining whether the characterising value complies with the rule.

In a development of the fifth or sixth aspects the set of entities may be a series of entities, the series having a first entity and a last entity, the characterizing value may be a serial value, and the rule may comprises a range defining the serial values.

In a development of the fifth or sixth aspects the set of entities may be a series of entities, the series having a first entity and a last entity, and comprising the further step of processing a plurality of characterizing values associated with respective entities to obtain the first entity and last entity, wherein the first entity may be the one of the entities having a lowest value and the last entity is the one of the entities having a highest value.

In a development of the fifth or sixth aspects the serial value may be a timestamp.

In a further development of the fifth or sixth aspects the range of values may be defined by reference to the serial value of the first entity and the serial value of the last entity.

In a further development of the fifth or sixth aspects the range of values may be defined by reference to the serial value of the first entity or the serial value of the last entity, together with a delta value.

In a further development of the fifth or sixth aspects the rule may be recorded in a blockchain and the locator is a blockchain transaction identifier.

In accordance with the present invention in a seventh aspect there may be provided a computer program adapted to implement the steps of the fifth or sixth aspects.

In accordance with the present invention in an eighth aspect there may be provided a device adapted to perform the method of the fifth or sixth aspects.

BRIEF DESCRIPTION OF THE DRAWINGS

The above and other advantages of the present invention will now be described with reference to the accompanying drawings, in which:
FIG. 7 shows a hand scanner device adaptable to constitute an embodiment.

DETAILED DESCRIPTION

Figure 1:
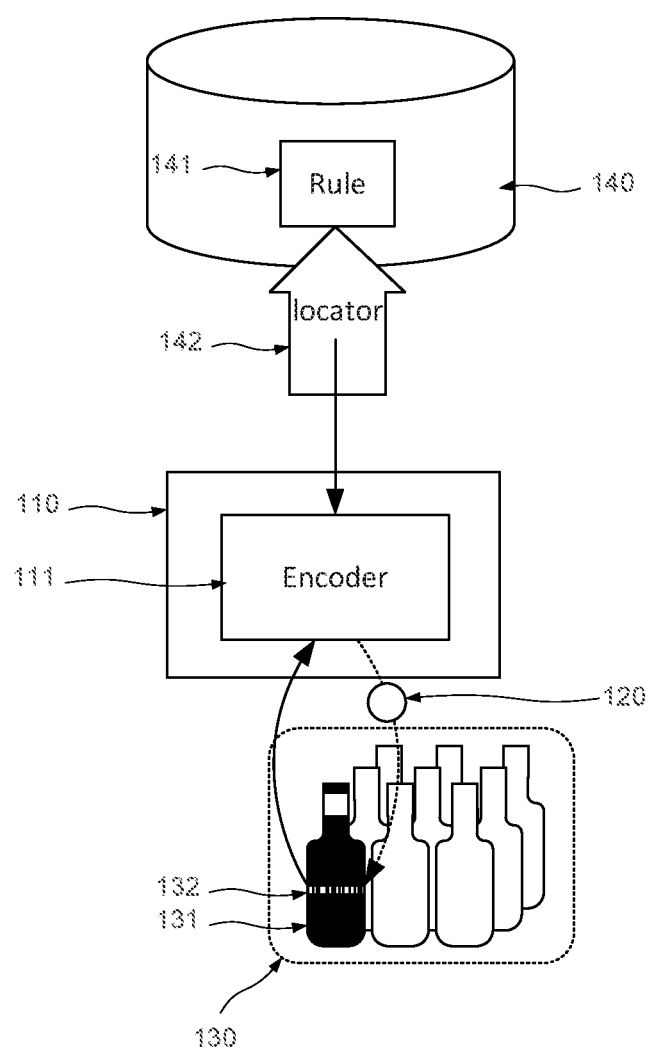
FIG. 1 presents an apparatus in accordance with an embodiment.

FIG. 1 presents an apparatus in accordance with an embodiment. As shown in FIG. 1, there is provided an apparatus 110 comprising an encoder 111 for creating an identifier 120 for a selected entity 131 belonging to a defined set of entities, where each entity has a characterizing value and where each characterizing value complies with a recorded rule 141. The apparatus is adapted to receive a locator 142 for the recorded rule, and to encode the characterizing value 132 of the selected entity 131 together with the locator 142.

By way of example, FIG. 1 shows each entity of the set of entities 130 as a bottle. It will be appreciated that the entities may comprise any type of object, which may furthermore be heterogeneous in nature, and not similar as shown. Furthermore, while the entities may be any physical object, they may also be intangible entities such as media recordings, licensed software, tickets for an event or site of interest, voucher, cheque or bond, and the like. Such intangible entities may or may not be associated with some physical component such as a label, chit, card or the like.

By way of example, the rule 141 is stored in a database 140. This database may include rules for other sets besides the set 130.

In this and other embodiments the characterizing value of the entities may be any characteristic of the entities which is capable of use in identifying a particular entity from the others in the set 130, and which is capable of numerical representation. Numerical in this sense should be interpreted broadly as encompassing alphanumerical encoding schemes, different number bases, and the like. Examples of characterizing value include a serial number which may be associated with each item, a time stamp, for example relating to a time and/or place of manufacture, a weight, colour or any other potentially distinguishing characteristic. As such, the characterising value may constitute either an intrinsic characteristic, or product signature such as a chemical signature for instance, or a PUF (Physically Unclonable Function), of each individual entity, or an external characteristic, which may be assigned to each entity specifically for the purposes of the present invention, or otherwise.

Still further, the characterising value need not be one dimensional, but may comprise a plurality of dimensions. For example the characterising value may comprise geographical or other coordinates. Where such multidimensional characterising values are used, these may be processed to obtain a single series of unique values via multiplication, addition, concatenation or the like, or each dimensional value may be treated as separate characterising sub value, with the set of sub values from the same dimension being subject to their own sub rule. These sub rules may then be recorded with a single locator as discussed above in which case the identifier will comprise each sub value and one rule locator, or may each be provided with a separate locator, in which case the identifier will comprise each sub value and each sub rule locator.

As described above, the apparatus is adapted to encode the unique identifier from an existing rule. In certain embodiments, the apparatus may additionally be adapted to associate a characterizing value with each entity in the set of entities 130, to determine the rule such that the rule defines each characterizing value, and to record the rule such that it may be retrieved with the locator.

The association of a characterizing value will depend on the chosen characteristic. In line with the examples given above, this may require equipment for applying a serial number, time stamp, geographical location or weighing or otherwise measuring a characteristic of the entity.

The determination of a rule defining each characterizing value may involve many different approaches, as set out in further detail below.

Recording the rule in the context of FIG. 1 will require writing the rule to the database 140, and retaining the row number and/or other Locator information.

In certain embodiments as described in further detail hereafter, the database 140 may be a blockchain, in which case the locator is the blockchain transaction identifier. The blockchain may be a suitable existing blockchain such as the Bitcoin or Ethereum blockchains, or some other Blockchain either generic in purpose or specifically intended for supporting the present invention. The Blockchain may be public or private.

Figure 2:
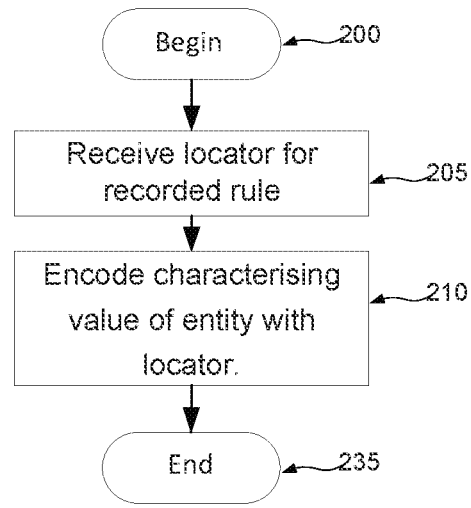
FIG. 2 shows a method in accordance with a second embodiment.

FIG. 2 shows a method in accordance with a second embodiment. As shown in FIG. 2 there is provided a method of creating an identifier for a selected entity belonging to a defined set of entities, where each entity has a characterizing value and where each characterizing value complies with a specified rule. As shown, the method begins at step 200 before proceeding to step 205 at which a locator for the recorded rule is received. The method next proceeds to step 210 at which the characterizing value of the selected entity is then encoded together with the locator.

Optionally, step 205 may be preceded by an additional step of associating a characterising value with each entity, determining the rule that defines each characterizing value, and recording the rule such that it may be retrieved with the locator.

Figure 3:
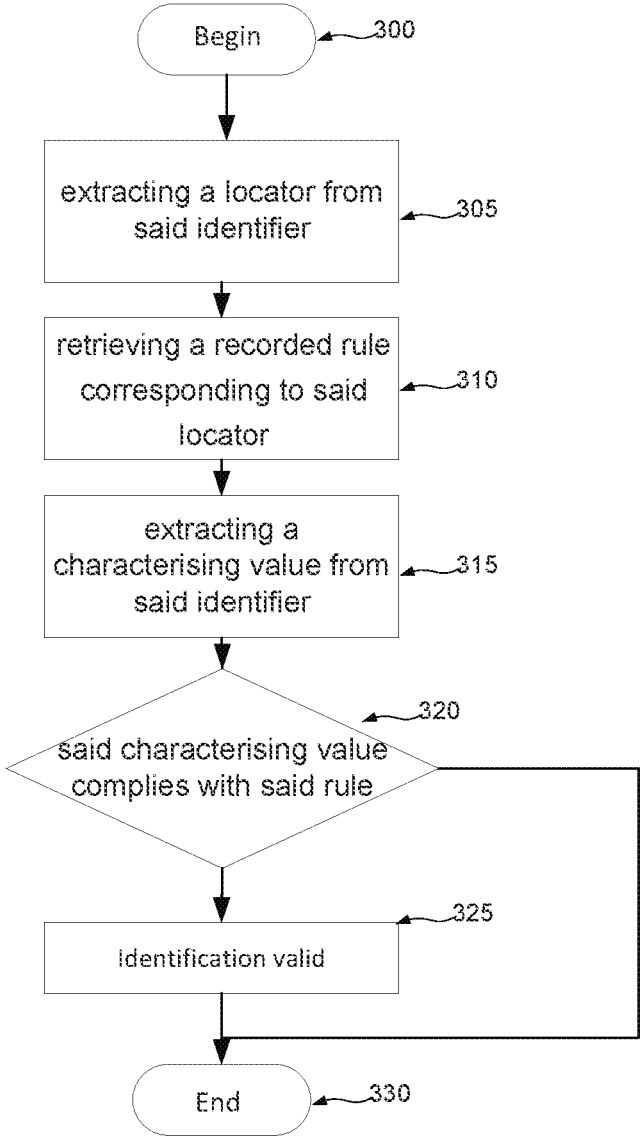
FIG. 3 shows a method in accordance with a third embodiment.

FIG. 3 shows a method in accordance with a third embodiment. FIG. 3 shows a method of identifying a selected entity belonging to a defined set of entities, the selected entity having an identifier. As shown, the method starts at step 300 before proceeding to step 305 at which a locator is extracted from the identifier. The method then proceeds to step 310 at which a recorded rule is retrieved as designated by the retrieved locator. The method then extracts a characterising value from the identifier at step 315, before determining whether the characterizing value complies with the rule at step 320, and in a case where the characterizing value does comply with the rule, the entity is deemed to have been validly identified by its characterizing value at step 325, whereupon the method terminates at step 330.

It will be appreciated that the steps of FIG. 3 need not be performed in the order described. For example, the extraction of the characterizing value may be carried out before the extraction of the locator, and the retrieval of the rule may be carried out at any time before the testing of compliance with that rule.

The apparatus of FIG. 1, and the methods of FIGS. 2 and 3 are all dependent on the definition of a set of entities, each entity having a characterizing value, and the definition of a rule defining the resulting set of values. There now follows more detailed discussion of possible approaches to these requirements.

In certain embodiments, the entities may be a series of entities with the series having a first entity and a last entity, and the characterizing value is a serial value, with the rule comprising a range defining the serial values. For example, the series of entities may be a series of articles produced sequentially on a production line. The inherent nature of this type of production means that there is necessary a first and last article in a given production run. Each article will typically be assigned a serial number representing its position in the sequence of production, which may or may not be attached to, printed on, or otherwise physically associated with the article.

The serial number may simply be assigned to each article as it is finished serially, or otherwise. For example, it may be envisaged that characterizing values be defined in a cumulative manner with new elements added at each step of a manufacturing process so as to trace the different steps of manufacturing for one article.

As an example,

Step 1: The article is cut from raw material: value assigned 003.

Step 2: Article is molded: value assigned 042.

Step 3: Article is assembled with another piece: value assigned 5784, where 57 is the serial value for step 3 itself, and 85 a pointer to the characterizing values of the other piece.

At the end, the article has a serial number 0030425784 which contains the set of characteristic values described above, and may then be used as the characterising value of the finished article.

Thus the first article and last article produced will have respective serial numbers, with the first produced article typically having a lower serial than the last produced article, and all of the intervening articles having correspondingly intermediate serial numbers. On this basis, a range of serial values may be defined. For example, if a first article has a serial number 10023000 and the last article has a serial number has a serial number 10024000, the rule may be defined as "10023000: 10024000". In accordance with the method of FIG. 2, the identifier of the five hundredth article manufactured would be defined incorporating its serial number 10023500. When applying the method of FIG. 3, this value 10023500 would then be extracted, and the rule "10023000: 10024000" retrieved, and since the value 1002355 indeed lies in the range "10023000: 10024000", in accordance with the method of FIG. 3 the identifier would be found to be valid.

Although the rule presented in this and other embodiments is a simple range, other rule types may be envisaged. The rule may specify that characterizing values be assigned from a particular mathematical progression in values, or a larger set of numbers defined in condensed form for example by reference to a mathematical or physical constant, or by application of a mathematical operator to a defined value, in any case the same rule must apply equally to the characterizing value of each entity in the set, and support the unambiguous determination of whether a particular characterising value complies with the rule, so the corresponding entity having that characterising value must be a member of the defined set of entities, or otherwise that the characterising value does not comply with the rule, so the corresponding entity having that characterising value must not be a member of the defined set of entities.

A similar situation arises where each article produced is associated with a time stamp, representing the time of its manufacture, or some other characteristic instant in the article's life cycle.

It should be borne in mind that the serial values need not be contiguous—it may be that certain values are not assigned to any article. This may occur where an article produced in a production run is rejected during an automated (or manual) quality check for example. This is particularly likely in the case where the serial value is a time stamp. Serial values may follow a certain coding scheme or include CRC Cyclic Redundancy Check. The rule may be devised so as to exclude intermediate values in a non-continuous series, for example by defining the resolution of values and hence the required gap between successive values, or alternatively it may be accepted that certain valid identifiers do not correspond to actual entities.

In some cases, it may be necessary to explicitly process the set of serial values to obtain the first entity and last entity, wherein the first entity is the one of the entities having a lowest value and the last entity is the one of entities having a highest value. For example, while in the case of a serial number or time stamps the values are inherently ordered, if a physical characteristic of the entities is used such a colour code or weight, further processing may be required to obtain the highest and lowest values, and hence the limits of the permissible range to be used as the basis of the rule.

It will be appreciated that while a range may be expressed in terms of its highest and lowest values, such as the range "10023000: 10024000" presented above, the same range may be expressed fined by reference to either the maxima or the minima together with a delta value for the opposite extreme, in other words, the first entity or the serial value of the last entity, together with a delta value. Thus the range "10023000: 10024000" might also be expressed as "10023000+1000" or "10024000-1000" for example.

As mentioned above, the rule may be recorded in a blockchain, in which case the locator is a blockchain transaction identifier. A blockchain is a particular distributed database structure, where sequential entries include an encrypted timestamp and hash of the preceding entry, such that no entry can be altered without breaking the relationship with the other entries. Many block chain implementations provide a comment field in each entry, which may be used for the storage of the rule of the present invention in a secure manner. Certain implementations impose a limit to the length of the comment field, imposing a requirement for conciseness on the rule formulation.

Each blockchain entry has a Transaction Identifier, also known as a "txID" or "tx ID" which may constitute the Locator of the present invention. The Transaction Identifier may take the following form, which relates to the Bitcoin Blockchain by way of the example:

5fa0f93a3b945479136235793aff5d973e0f3338020c863-5d4c0bfd91d5c17 2

Portals are available through which an entry may be retrieved by means of the Transaction Identifier, for example:

https://blockchain.info/tx/25fa0f93a3b94547913623579-3 aff5d973e0f333 8020c8635d4c0bfd91d5c172 https://blockexplorer.com/tx/25fa0f93a3b94547913623-5793aff5d973e0f3 338020c8635d4c0bfd91d5c172
https://live.blockcypher.com/btc/tx/25fa0f93a3b9454791-36235793aff5d973e0f333802 0c8635d4c0bfd91d5c172/1-00681

Figure 4:
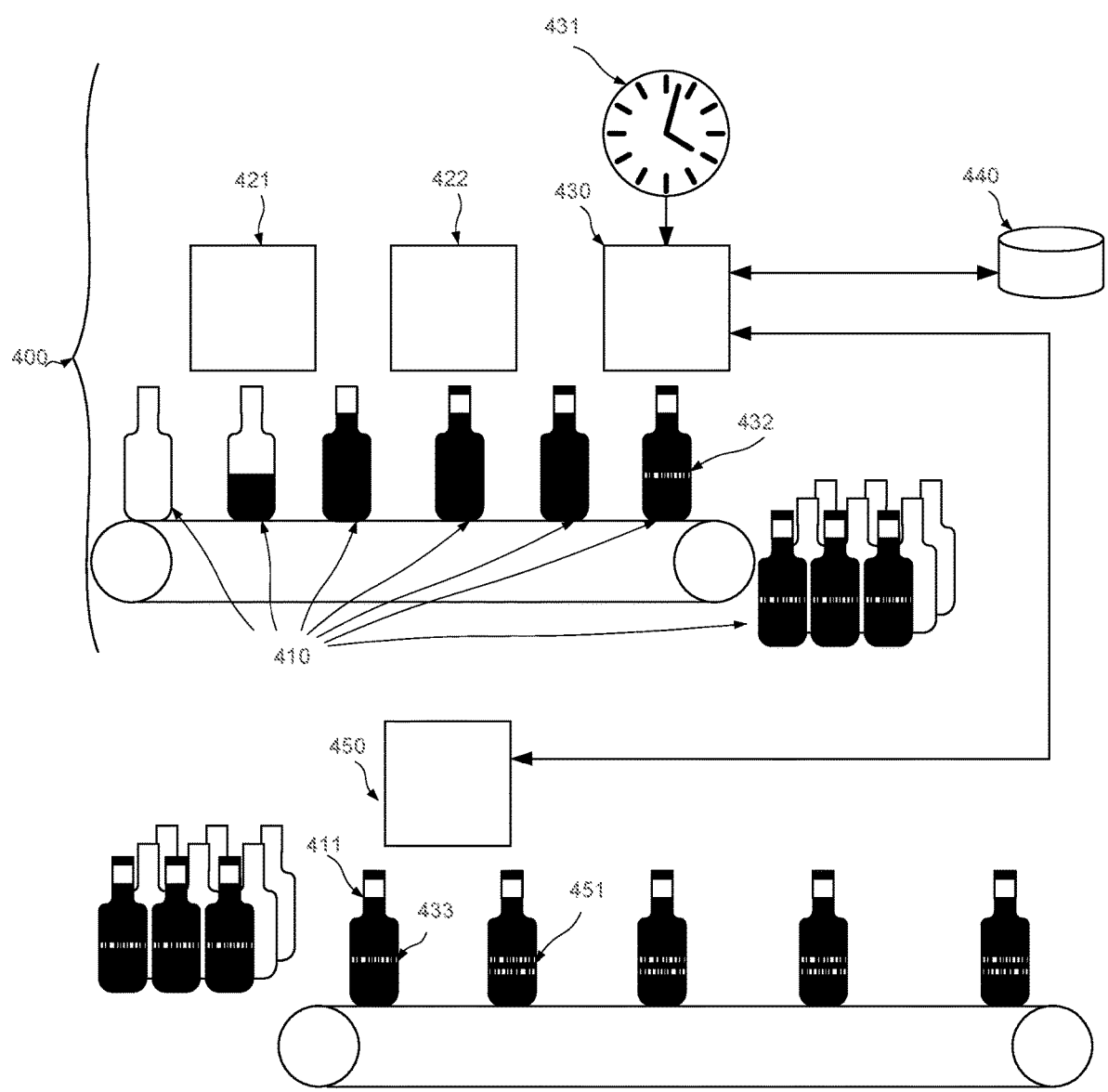
FIG. 4 shows an exemplary environment implementing an embodiment.

FIG. 4 shows an exemplary environment implementing an embodiment. As shown in FIG. 4, there is provided a production line 400, producing bottles of product 410, constituting entities as discussed above. The production line comprises a sequence of product processing units 421, 422, and a characterizing unit 430. The characterizing unit is coupled to a clock unit 431. As each bottle reaches the characterizing unit 430 at the end of the production line, the characterizing unit 430 applies a bar code 432, 433 representing a time stamp corresponding to the time that bottle reached the end of the production line as indicated by the clock 431. In this example, data encryption has not been used for greater clarity and understanding.

The first bottle receives the following time stamp:
t0 tms:[2016-11-23 18:14:39.479]
num: [1479921279479]
bin:[0101100010010010001011101010000111110111]
b64:[ViSLqH3]

The last bottle in the production run receives the following time stamp:
te tms:[2016-11-23 22:54:16.691] (t0+16 777 215 ms)
num:[1479938056691]
bin:[1010110001001001100101110101000011110011]
b64: [ViTLqHz]

On this basis the characterizing unit develops the rule formulation ViSLqH3:ViTLqHz and writes this to the blockchain 440:
put f(t0,te) ViSLqH3ViTLqHz
and in return receives the locator as follows:
txID (Base64): CX6D5OjuUVHkTYjV5Ov9dlz4PMzg-CDIY11MC_2R1cFy Once the production run is complete, the process of assigning identifiers can ensue. Note that in this example identifiers can only be assigned after the production run because the rule can only be defined and recorded once the complete set of characteristic values is available for the entire set of entities, and the time stamp of the last entity is not known until the production run is complete. In other embodiments it may be possible to apply identifiers as part of a continuous process, for example in a production run of known length, where serial numbers are used instead of time stamp values.

As shown in FIG. 4, the identifier unit 450 corresponds to the apparatus of FIG. 1. The identifier unit 450 receives the locator for the recorded rule from the characterizing unit 430, and furthermore reads the characterizing value (time-stamp) of each bottle from its respective barcode 433, and encodes this together with the locator, and applies a new barcode 451 bearing this identifier.

For example, if the bottle 411 was the $294^{th}$ bottle in the production run, its characterizing value will be:
t294 tms:[2016-11-23 18:14:39.773]
num: [1479921279773]
bin:[1010110001001001000101110101000011000111101]
b64: [ViSLqMd]
UID253: ViSLqMd Which the identifier unit 450 may then encode with the Locator
CX6D5OjuUVHkTYjV5Ov9dlz4PMzgCDIY11MC_2R1-cFy as follows:
ViSLqMdCX6D5OjuUVHkTYjV5Ov9d1z4PMzgCDI-Y11MC_2R1c Optionally, the identifier and/or locator may be encoded as a URL, URI or the like, for example:
http://mt.ag/
blViSLqMdCX6D5OjuUVHkTYjV5Ov9dlz4PMzgCDIY-11MC_2R1c The use of a URI makes implementations flexible and accessible via common and compatible platforms.

In this example the URI specifies HTTP in the scheme name part of the URI, and the identifier in the hierarchical part. In this and other embodiments any suitable URI scheme or protocol may be used. This may be an existing protocol such as suitable schemes listed at http://www.iana.org/assignments/uri-schemes/uri-schemes.xhtml, or one specified for the purpose of the present invention.

The scheme name portion of the URI may be selected so as to cause the URI to be interpreted as a call to a local resource adapted to de-code the object identifier. Adapting the URI in this way provides a mechanism for calling the local resource in a manner which is platform independent and requires minimal modification of existing platforms.

The URI may be defined so as to resolve to a web site. Web sites are a convenient mechanism for conveying information to a user. This may be a mechanism for reporting the results of the decoding, or as a channel for conveying ancillary information in parallel.

Accordingly, there is provided an identifier for a selected entity belonging to a defined set of entities, where each entity has a characterizing value and where each characterizing value complies with a specified rule, where the identifier comprises the respective characterizing value of the selected entity encoded together with a locator for the rule.

As mentioned in the embodiment of FIG. 4, the identifier in this or any embodiment may be encoded as a bar code, or indeed any machine readable code. More particularly:

- It may be optically readable, for instance in the form of an alphanumeric code, or a one, two (including "QR Codes") or three dimensional bar code, or a holographic code. The machine readable code may be disposed together with other visual content, for example by steganography.
  Optical reading, by way of a camera, laser scanner etc, has a security advantage over radio communications in that it requires a line of sight and specified alignment with the object, making covert reading of the object difficult. Consumer devices are very frequently provided with a camera device, meaning that such readers can be advantageously implemented without the need to add special hardware.
- It may be readable optically, or as a light wave emitted by the object, either continuously, periodically or in response to stimulation by a user or generated by the user device implementing the invention. This stimulation may be mechanical, sonic, electronic, optical or by any other suitable mechanism.
- It may be magnetically readable, for example in the form of a magnetic strip.
- It may be readable by radio communication, for example by RFID, NFC or Bluetooth Low Energy systems.
  Radio communications have the advantage of not requiring physical contact, or even line of sight between the object and a reader. Short range radio communications are increasingly used in consumer devices, meaning that such readers can be advantageously implemented without the need to add special hardware.
  It may be readable acoustically, or as a sound wave emitted by the object, either continuously, periodically or in response to stimulation by a user or generated by the user device implementing the invention. This stimulation may be mechanical, sonic, electronic, optical or by any other suitable mechanism.

Although sound waves do not require physical contact, or even line of sight between the object and a reader, they are subject to diffusion and interference inherently limiting the range at which they can be used. As such, in some implementations sound waves can offer a compromise between the characteristics of optical and radio reading. Consumer devices are often provided with microphones, meaning that such readers can be advantageously implemented without the need to add special hardware.

It may be readable as a tactile or palpable code, for example in the form of punched indentations or bumps, which may be read by optical or mechanical means.

As such, the step of reading an identifier may comprise scanning an optical code, interrogating an RFID tag, or whatever other reading operation may correspond to the machine readable encoding method employed as per the preceding examples or otherwise.

If at some later point it is desired to determine the authenticity of bottle 411 bearing identifier barcode 433 as discussed above, in accordance with the method of FIG. 3, the identifier http://mt.ag/blViSLqMdCX6D5OjuUVHkTYjV5Ov9d-lz4PMzgCDIY- 11MC_2R1c is read or otherwise captured in the manner appropriate to the method of encoding, and the locator extracted from the identifier.

i.e. in this case CX6D5OjuUVHkTYjV5Ov9dlz4-PMzgCDIY11MC_2R1c is extracted, and the blockchain database queried. The recorded rule ViSLqH3ViTLqHz corresponding to this locator is thus retrieved.

The characterising value ViSLqMd is similarly extracted from the identifier, and it is then determined whether the characterising value complies with the rule. Specifically, ViSLqMd lies between ViSLqH3 and ViTLqHz in base64, so the character value does comply with the rule.

In variants of the foregoing embodiments, the encoding applied to the characterizing value and the Locator in creating the identifier may comprise scrambling one value with the other for example with a "scramble" or "shuffle" function, thereby improving the security of the described approach. Whatever approach is used to encode the identifier will generally need to be implicitly available at an identifier needing to decode the identifier to extract the characterising value and locator.

In variants of the foregoing embodiments, the encoding applied to the characterizing value and the Locator in creating the identifier may comprise encryption, thereby improving the security of the described approach. Also, in some embodiments, encryption may be added to increase security level.

Thus in certain embodiments secure identifiers for a series of articles are generated by encoding a characterising value such as a time stamp or serial number of each article with a pointer to a database entry such as a blockchain entry storing a range of valid characterising values, or other rule permitting the validation of each characterising value. When an identifier is challenged, the pointer is extracted and used to retrieve the rule, against which the characterising value extracted from the same identifier is tested.

Embodiments can take the form of an entirely hardware embodiment (e.g. FPGA), an entirely software embodiment (for example to control a system according to the invention) or an embodiment containing both hardware and software elements.

Software embodiments include but are not limited to firmware, resident software, microcode, etc. The invention can take the form of a computer program product accessible from a computer-usable or computer-readable medium providing program ode for use by or in connection with a computer or an instruction execution system.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a computer or any other device with processing capability, such as a robot, drone or other connected device.

Figure 5:
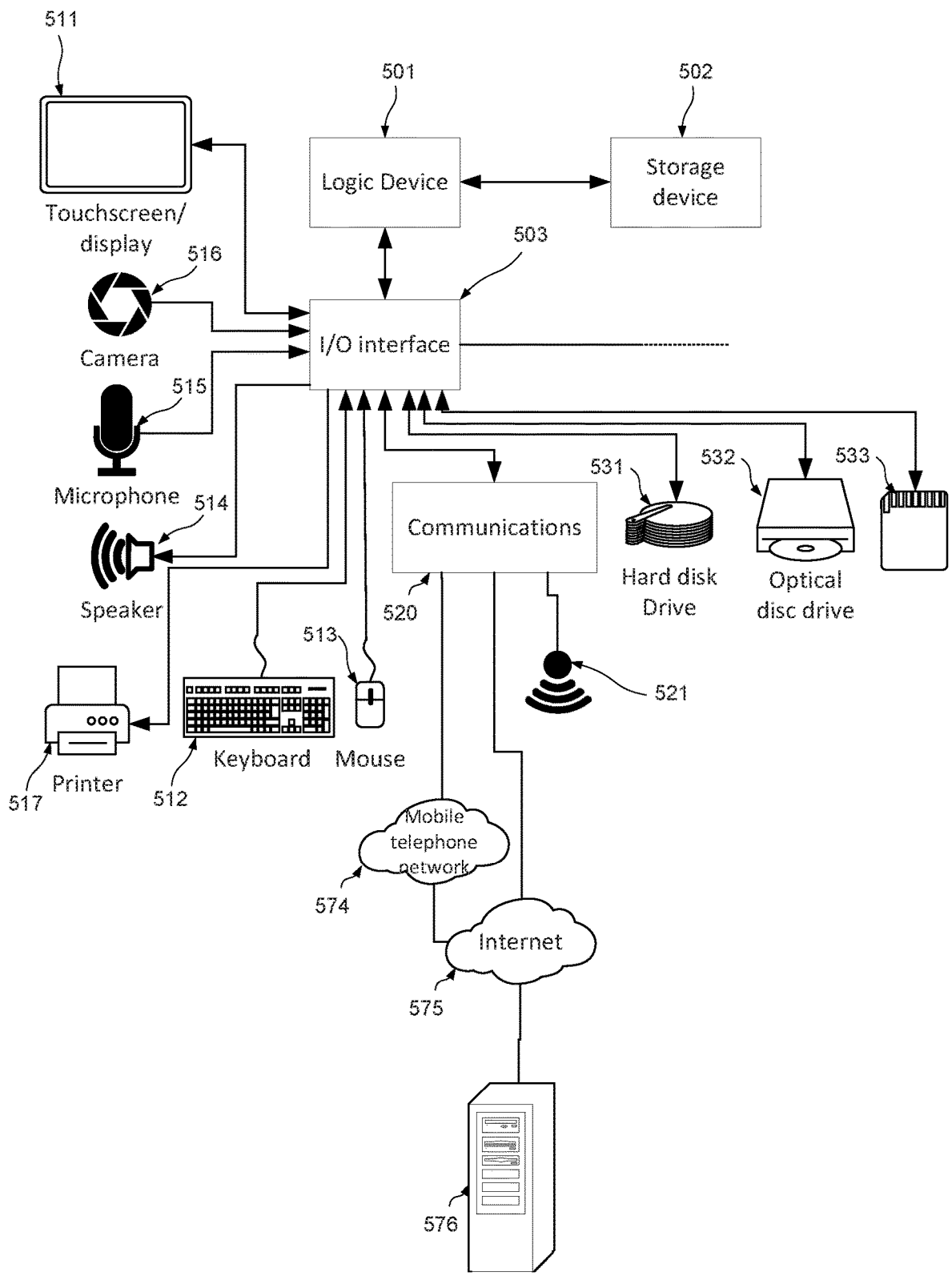
FIG. 5 shows a generic computing system suitable for implementation of embodiments of the invention.

FIG. 5 shows a generic computing system suitable for implementation of embodiments of the invention.

A shown in FIG. 5, a system includes a logic device 501 and a storage device 502. The system may optionally include a display subsystem 511, input/output subsystem 503, communication subsystem 520, and/or other components not shown.

Logic device 501 includes one or more physical devices configured to execute instructions. For example, the logic device 501 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 501 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 501 optionally may be distributed among two or more separate devices, which may be remotely located and/or configured for coordinated processing. Aspects of the logic device 501 may be virtualized and executed by remotely accessible, networked computing devices configured in a cloud-computing configuration.

Storage device 502 includes one or more physical devices configured to hold instructions executable by the logic device to implement the methods and processes described herein. When such methods and processes are implemented, the state of storage 502 device may be transformed—e.g., to hold different data.

Storage device 502 may include removable and/or built-in devices. Storage device 502 may comprise one or more types of storage device including optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 503 adapted to support communications between the Logic device 501 and further system components. For example, additional system components may comprise removable and/or built-in extended storage devices. Extended storage devices may comprise one or more types of storage device including optical memory 532 (e.g., CD, DVD, HD-DVD, Blu-Ray Disc, etc.), semiconductor memory 533 (e.g., RAM, EPROM, EEPROM, FLASH etc.), and/or magnetic memory 531 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 501 and storage device 502 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 5 may be used to implement embodiments of the invention.

For example a program implementing the steps described with respect to FIG. 2 or 3 may be stored in storage device 502 and executed by logic device 501. The database 140 may be stored in storage device 502 or the extended storage devices 532, 533 or 531. The Logic device may cause the camera 516 or Near Field interface 521 to read the profile code and/or content code, or otherwise cause the printer 517 or Near Field interface 521 to impose the object identifier and/or the machine readable code.

Accordingly the invention may be embodied in the form of a computer program.

Furthermore, when suitably configured and connected, the elements of FIG. 5 may constitute a system for defining an identifier. Such a system may be adapted to combine user parameters and context parameter from a memory (such as 502, 531, 532, 533 and define a machine readable representation of a profile code reflecting these values for use in defining a content operation for application to a content structure with regard to the identifier.

It will be appreciated that a "service", as used herein, is an application program executable across multiple user sessions. A service may be available to one or more system components, programs, and/or other services. In some implementations, a service may run on one or more server-computing devices.

When included, display subsystem 511 may be used to present a visual representation of data held by storage device. This visual representation may take the form of a graphical user interface (GUI). As the herein described methods and processes change the data held by the storage device 502, and thus transform the state of the storage device 502, the state of display subsystem 511 may likewise be transformed to visually represent changes in the underlying data. Display subsystem 511 may include one or more display devices utilizing virtually any type of technology. Such display devices may be combined with logic device and/or storage device in a shared enclosure, or such display devices may be peripheral display devices.

When included, input subsystem may comprise or interface with one or more user-input devices such as a keyboard 512, mouse 513, microphone 514, speaker 515, touch screen 511, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 520 may be configured to communicatively couple computing system with one or more other computing devices. For example, communication module of may communicatively couple computing device to remote service hosted for example on a remote server 576 via a network of any size including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 574, or a wired or wireless local- or wide-area network. In some embodiments, the communication subsystem may allow computing system to send and/or receive messages to and/or from other devices via a network such as the Internet 575. The communications subsystem may additionally support short range inductive communications 521 with passive devices (NFC, RFID etc).

The system of FIG. 5 is intended to reflect a broad range of different types of information handling system. It will be appreciated that many of the subsystems and features described with respect to FIG. 5 are not required for implementation of the invention, but are included to reflect possible systems in accordance with the present invention. It will be appreciated that system architectures vary widely, and the relationship between the different sub-systems of FIG. 5 is merely schematic, and is likely to vary in terms of layout and the distribution of roles in systems. It will be appreciated that, in practice, systems are likely to incorporate different subsets of the various features and subsystems described with respect to FIG. 5.

Figure 6:
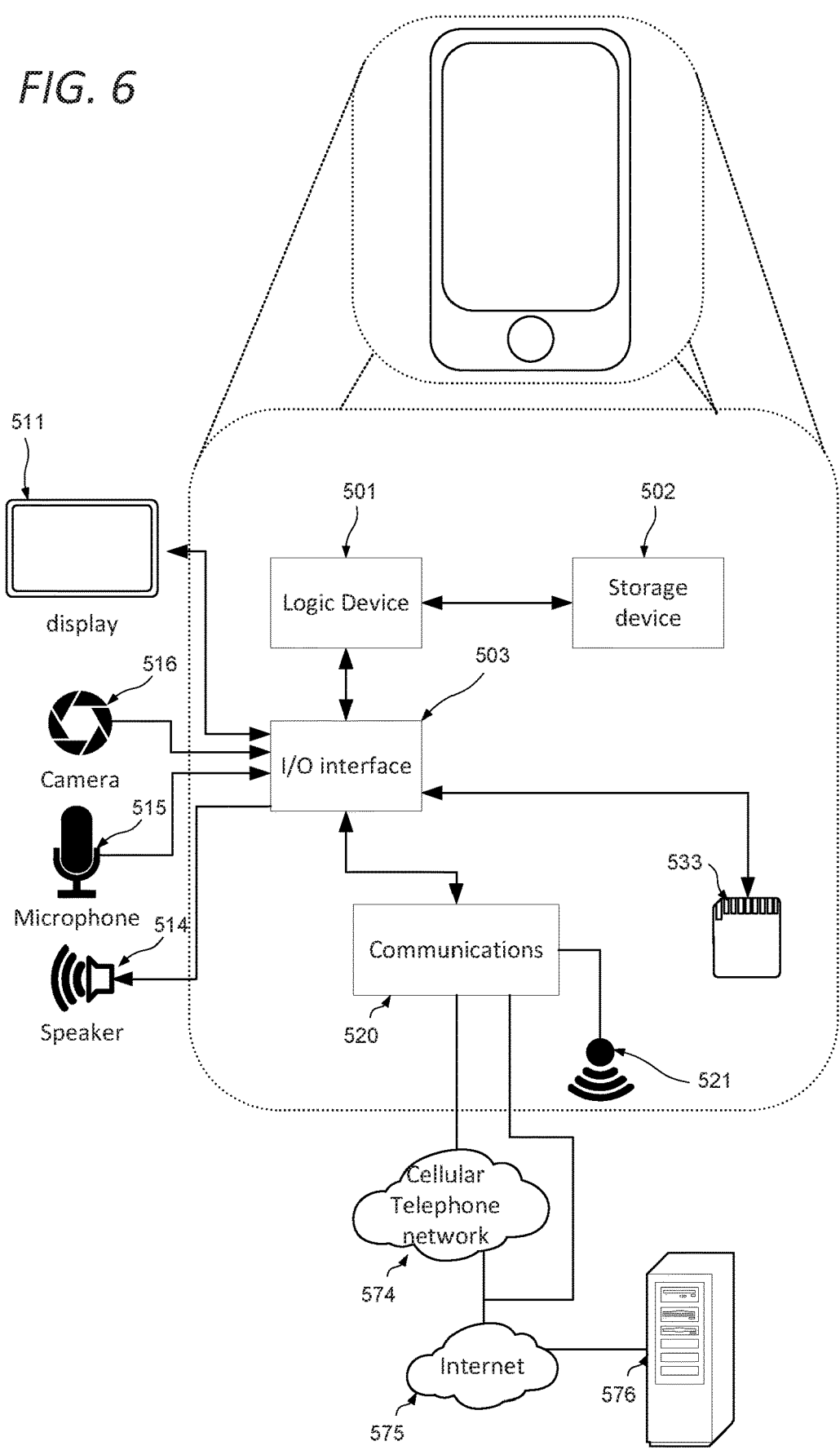
FIG. 6 shows a smartphone device adaptable to constitute an embodiment.

FIGS. 6 and 7 disclose certain example devices in accordance with the present invention. Those of ordinary skill in the art will appreciate that systems may be employed in the future which also operate in accordance with the present invention.

FIG. 6 shows a smartphone device adaptable to constitute an embodiment. As shown in FIG. 6, the smartphone device incorporates elements 501, 502, 503, 520, 533, 514, 515, 516, 511, 521 as described above. It is in communication with the telephone network 574 and/or a server 576 via the network 575. On the other hand, elements 531, 532, 517, 512, 513 may be omitted. It will be appreciated that the features disclosed in this figure may also be included within a tablet device, a dedicated hand held display unit and the like.

FIG. 7 shows a hand scanner device adaptable to constitute an embodiment. As shown in FIG. 7, the hand scanner device incorporates elements 501, 502, 503, 520, 533, 511, 514, 516 and 521 as described above. It is in communication with a server 76 via the network 75. On the other hand, elements 531, 532, 517, 512, 513 and 74 are omitted. 521 is present on the basis that the device shown is an NFC scanner, however this could of course be replaced with any sensor corresponding to any of the machine readable code types envisages herein. As such, the hand scanner of FIG. 7 is one embodiment of an apparatus for identifying a selected entity belonging to a defined set of entities, the selected entity having an identifier, the apparatus being adapted to:
read the identifier,
extract a locator from the identifier,
retrieve a recorded rule corresponding to the locator,
extract a characterising value from the identifier, and
determine whether said characterising value complies with the rule.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An apparatus for creating an identifier for a selected entity belonging to a defined set of entities, where each said entity has a characterizing value and where each said characterizing value complies with a common recorded rule, said apparatus comprising an encoder configured to receive a locator specifying where said recorded rule is to be electronically retrieved, and to encode the characterizing value of said selected entity together with said locator, wherein said rule specifies one or more of
a maxima and a minima defining a range, or
a particular mathematical progression, or
a set of numbers defined in condensed form, or
a mathematical or physical constant, or
a mathematical operator applied to a defined value.

2. The apparatus of claim 1, said encoder further configured to associate a characterizing value with each said entity, to determine said rule such that said rule defines each said characterizing value, and to record said rule such that it is retrieved with said locator.

3. An apparatus for identifying a selected entity belonging to a defined set of entities, said selected entity having an identifier, said apparatus configured to:
read said identifier, extract a locator from said identifier, electronically retrieve a recorded rule common to each entity of said set from a location specified by said locator, extract a characterising value from said identifier, and determine whether said characterizing value complies with said rule, wherein said rule defines one or more of
a maxima and a minima defining a range, or
a particular mathematical progression, or
a set of numbers defined in condensed form, or
a mathematical or physical constant, or
a mathematical operator applied to a defined value.

4. An identifier for a selected entity belonging to a defined set of entities, where each said entity has a characterizing value and where each said characterizing value complies with a common recorded rule, said identifier comprising the respective characterizing value of said selected entity encoded together with a locator specifying where said recorded rule is to be electronically retrieved, wherein said rule defines one or more of
- a maxima and a minima defining a range, or
- a particular mathematical progression, or
- a set of numbers defined in condensed form, or
- a mathematical or physical constant, or
- a mathematical operator applied to a defined value.

5. A machine readable label encoded with the identifier of claim 4.

6. A method of creating an identifier for a selected entity belonging to a defined set of entities, where each said entity has a characterizing value and where each said characterizing value complies with a common recorded rule, said method comprising: receiving a locator specifying where said recorded rule is to be electronically retrieved, and encoding the characterizing value of said selected entity together with said locator wherein said rule defines one or more of
- a maxima and a minima defining a range, or
- a particular mathematical progression, or
- a set of numbers defined in condensed form, or
- a mathematical or physical constant, or
- a mathematical operator applied to a defined value.

7. The method of claim 6 further comprising: associating a respective characterising value with each said entity, determining said rule such that said rule defines each said characterizing value, and recording said rule such that it is retrieved with a locator.

8. The method of claim 6 wherein said set of entities is a series of entities, said series having a first entity and a last entity, said characterizing value is a serial value, and said rule comprises a range defining said serial values.

9. The method of claim 8 in which said range of values is defined by reference to the serial value of said first entity and/or the serial value of said last entity.

10. The method of claim 8 in which said range of values is defined by reference to the serial value of said first entity or the serial value of said last entity, together with a delta value.

11. The method of claim 10 in which said rule is recorded in a blockchain and said locator is a blockchain transaction identifier.

12. The method of claim 6 wherein said set of entities is a series of entities, said series having a first entity and a last entity, and comprising the further step of processing a plurality of said characterizing values associated with respective said entities to obtain said first entity and last entity, wherein said first entity is the one of said entities having a lowest said value and said last entity is the one of said entities having a highest said value.

13. The method of claim 12 in which said serial value includes a timestamp.

14. A computer program product comprising computer executable programming instructions stored on a non-transitory computer storage media wherein the computer executable programming instructions when executed by one or more processor implements the method of claim 6.

15. A method of identifying a selected entity belonging to a defined set of entities, said selected entity having an identifier, said method comprising: extracting a locator from said identifier, retrieving a recorded rule common to each entity of said set corresponding to said locator, extracting a characterizing value from said identifier, and determining whether said characterizing value complies with said rule wherein said rule defines one or more of
- a maxima and a minima defining a range, or
- a particular mathematical progression, or
- a set of numbers defined in condensed form, or
- a mathematical or physical constant, or
- a mathematical operator applied to a defined value.

* * * * *